Patented Apr. 15, 1952

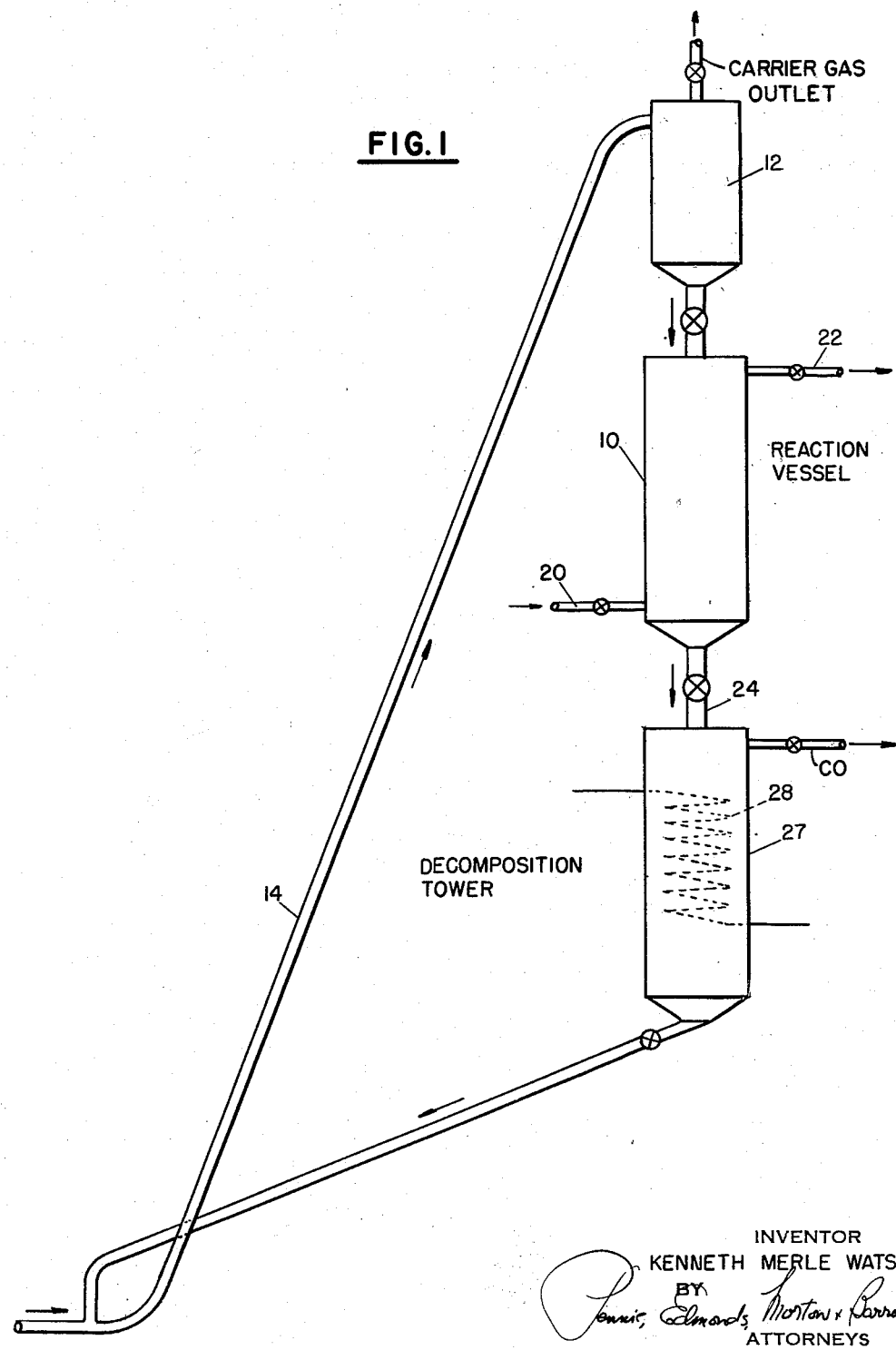

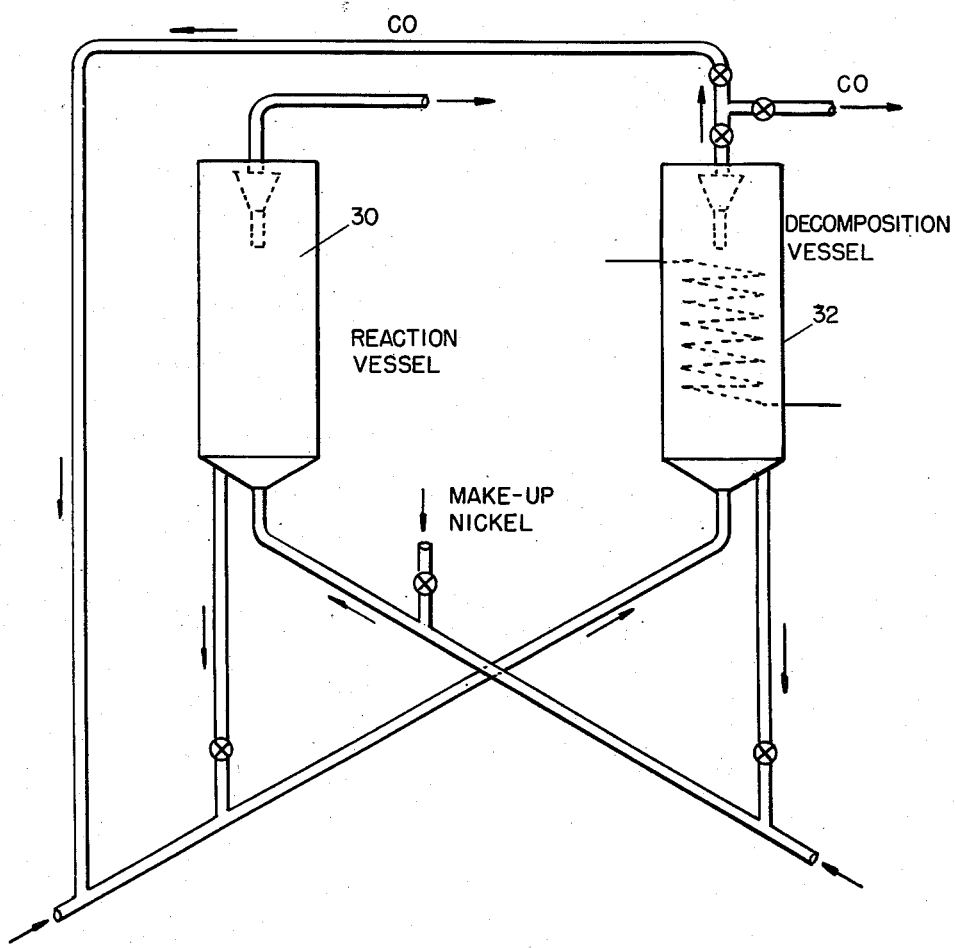

2,593,232

UNITED STATES PATENT OFFICE 2,593,232

PROCESS OF CONCENTRATING OR PURIFYING CARBON MONOXIDE OCCURRING IN ADMIXTURE WITH OTHER GASES

Kenneth Merle Watson, Madison, Wis., assignor to Sinclair Refining Company, New York, N. Y., a corporation of Maine Application July 18, 1947, Serial No. 761,771

5 Claims. (Cl. 23—204)

This invention relates to improvements in the concentration of carbon monoxide from mixtures containing it, in particular, mixtures of carbon monoxide and hydrogen or other gases with which carbon monoxide is commonly associated as, for example, water gas, Fischer-Tropsch synthesis gas and the like. Most processes for the production of carbon monoxide result in its production in admixture with large proportions of other gases such as hydrogen, carbon dioxide, nitrogen, etc. For use of carbon monoxide in many chemical reactions, it is desirable to have it in concentrated form with at most small proportions of other gases; and the present invention relates to an improved process for this concentration or purification of carbon monoxide.

In accordance with the present invention, carbon monoxide is separated from hydrogen or other associated gases by conversion to nickel carbonyl by reaction with a form of nickel having a high surface area, such as in a conventional nickel on kieselguhr catalyst, followed by decomposition of the nickel carbonyl with liberation of the carbon monoxide in substantially pure form and reformation of the nickel having the high surface area, the process thus involving alternate formation of the nickel carbonyl and its decomposition to carbon monoxide and nickel.

In carrying out the process the nickel having the extended surface area as in a conventional nickel on kieselguhr catalyst is advantageously handled as a moving bed, either in granular or pelleted form or as a fluidized bed, being passed first through a vessel in which it is brought into contact with the admixed gases from which separation of the carbon monoxide is desired followed by passage through a second vessel for the decomposition of the nickel carbonyl and regeneration of the supported nickel. The nickel is used in any convenient form in which the nickel has a high surface area, and is advantageously in the form of a conventional supported nickel catalyst, such as the nickel supported on kieselguhr commonly used for hydrogenation. If the nickel is to be handled as a moving bed, the product will be in the form of granules or pellets, while if it is to be used in the form of a fluidized bed it will be used in finely divided form, for example, around 60 to 300 mesh.

In general, the vessel in which the reaction to form the nickel carbonyl with separation of the carbon monoxide from associated gases takes place will be maintained at a relatively low temperature and at atmospheric or super-atmospheric pressure. Temperatures within the range of about 40° to 200° C. are used with advantage. The pressure used need not be high, for example, atmospheric to 100 pounds per square inch, although higher pressures may be used with advantage, say, pressures up to about 2,000 pounds per square inch, or even higher. At pressures within the range of up to about 100 pounds per square inch, temperatures of 40° to 80° C. are particularly advantageous.

In the vessel in which the nickel carbonyl is decomposed with liberation of the carbon monoxide and reformation of the nickel with the extended surface area, somewhat higher temperatures are used to favor the decomposition of the nickel carbonyl. Thus, this vessel may be maintained at temperatures of somewhat above 100° C. up to 300° C. or even somewhat higher, the effective upper limit of the temperature being that at which the nickel-adsorbent mass tends to sinter and lose its extended surface area. Pressures in the decomposition vessel are advantageously relatively low, for example, atmospheric to 100 pounds per square inch. Conveniently, atmospheric pressure may be used. The nickel-adsorbent mass, after decomposition of the nickel carbonyl, is cooled to about the temperature maintained in the adsorption vessel and then returned to that vessel.

Losses through reduction of the carbonyl, or reaction of the carbon monoxide with hydrogen in the adsorption vessel, are minimized, and, indeed, made negligible by the use of the low temperatures in that vessel, which are below those at which nickel carbonyl is reduced or any significant reaction between carbon monoxide and hydrogen even in the presence of a catalytic material such as nickel takes place.

Nickel carbonyl is a liquid boiling at 43° C. and if lower pressures are used in the reaction vessel, it will be desirable to provide a conventional absorber-stripper recovery system to strip the nickel carbonyl from the effluent gases, from which it may be passed to the decomposition vessel.

The nickel-adsorbent mass is prepared in the conventional manner for the preparation of supported nickel catalysts, and if it is to be used as a moving bed, is formed into granules or pellets in the usual way, and if it is to be used as a fluidized bed, is ground to a particle size of about 60 to 300 mesh in the usual way.

Apparatus for carrying out the process of the invention are illustrated diagrammatically in the attached drawings in which Fig. 1 illustrates apparatus which may be used for the moving bed type of operation, and Fig. 2 represents apparatus which may be used for the fluidized type of operation.

In the apparatus illustrated in Fig. 1, there is provided an elongated adsorption or reaction vessel 10 with a hopper 12 at the top through the nickel-adsorbent mass consisting of nickel on kieselguhr in granular form is supplied by the gas lift 14, which lift must be operated by an inert gas such as flue gas, the gas to be treated, or effluent from the top of the treater or the like, in view of the pyrophoric nature of the nickel mass. The nickel-adsorbent mass passes downwardly through the vessel, its flow being controlled in the usual way for downwardly moving beds of granular material. The mixture containing carbon monoxide, hydrogen and other gases from which it is desired to concentrate or purify the carbon monoxide is introduced at the bottom of the tower through the inlet 20, the pressure in the column being maintained at from atmospheric to 2,000 pounds per square inch or higher and the temperature at from 40° to 200° C., advantageously toward the lower part of this range. The hydrogen and gases other than carbon monoxide leave the top of the vessel through the outlet 22, while the granular adsorbent material, now carrying the carbon monoxide in the form of nickel carbonyl passes through the conduit 24 at the bottom of the tower to the top of the decomposition tower 27. The mechanical arrangement for the passage of the granular material through this is conventional. The decomposition tower is provided with heating tubes 28, which may be heated by the feed gas, if it is generated at a relatively high temperature, as is the case with syntheses or water gas, or other sources of heat may be used. The temperature within this tower is 100° C. or higher and is substantially higher than that used in the reaction tower but below temperatures at which sintering of the supported nickel takes place. The pressure in this tower is, with advantage, about the same as that in the reaction tower though it may be substantially lower. Also, if relatively high temperatures are used in tower 27 somewhat higher pressures may be used.

The adsorbent mass, after decomposition of the nickel carbonyl, again consisting of nickel having high surface area supported on the kieselguhr or other supporting material, is discharged from the bottom of the decomposition tower through a conventional discharge device to the gas lift 14, by which it is lifted to the hopper at the top of the adsorbent tower, passing in the course of this through cooling tubes (not shown) in which its temperature is reduced if necessary to that maintained in the reaction tower.

In the apparatus illustrated in Fig. 2, the nickel adsorbent mass is handled in the form of a fluidized bed, the apparatus being similar to conventional apparatus for the use of powdered materials as fluidized catalysts, the conversion of the carbon monoxide to nickel carbonyl being carried out in the vessel 30 and the decomposition to nickel and carbon monoxide in the vessel 32. The nickel-adsorbent mass, carrying the carbon monoxide in the form of nickel carbonyl discharged from the vessel 30 is transferred to the decomposition vessel with the use of recycled carbon monoxide as the carrier while the material from which the carbon monoxide has been removed in the decomposition vessel is returned to the reaction vessel, after cooling, using the gas stream from which the carbon monoxide is to be concentrated or purified as the carrier. As in the apparatus of Fig. 1, suitable heating and cooling means are provided in both chambers to provide the appropriate temperature control and the pressures are maintained within about the same levels described in connection with the moving bed type of apparatus.

I claim:

1. The process of concentrating or purifying carbon monoxide occurring in admixture with other gases which comprises bringing the gas mixture into contact with an adsorbent mass containing nickel in a form having a high surface area at a relatively low temperature of the order of about 40° to 200° C., whereby the carbon monoxide is adsorbed from the gases as nickel carbonyl, subjecting the adsorbed nickel carbonyl to a temperature of the order of about 100° to 300° C., to decompose the nickel carbonyl with formation of carbon monoxide and regeneration of the nickel with the high surface area, the temperature in the decomposing step being substantially higher than the temperature in the corresponding absorption step and collecting the carbon monoxide thus formed.

2. The process as in claim 1 in which the adsorbent mass consists of nickel on a carrier material.

3. The process as in claim 1 in which nickel on a carrier material is continuously introduced into one vessel where it is brought into contact with the mixture from which the carbon monoxide is to be removed, and the resulting nickel carbonyl on the carrier material is continuously removed from said vessel and introduced into the second vessel at a higher temperature in which the nickel carbonyl is decomposed, with regeneration of the nickel on a carrier material which is returned to the first vessel, and with recovery of the carbon monoxide formed.

4. The process as in the preceding claim 3 in which the nickel on a carrier material is in granular form and the mass of nickel on a carrier material is handled as a moving bed.

5. The process as in claim 3 in which the nickel on a carrier material is in powder form and is handled as a fluidized bed.

KENNETH MERLE WATSON.

REFERENCES CITED

The following references are of record in the file of this patent:

UNITED STATES PATENTS

| Number | Name | Date |
|---|---|---|
| 1,789,813 | Gaus | Jan. 20, 1931 |
| 2,212,459 | Simpson | Aug. 20, 1940 |
| 2,221,061 | Simpson | Nov. 12, 1940 |
| 2,254,158 | Simpson | Aug. 26, 1941 |
| 2,420,129 | Flock et al. | May 6, 1947 |

OTHER REFERENCES

Ser. No. 353,130, Marton (A. P. C.), published Apr. 27, 1943.

Mond: "The Metal Carbonyls," June 13, 1930, Jour. of Chemical Industry, pages 271T to 273T.